April 10, 1956  W. B. DONAGHEY ET AL  2,741,034
GEAR TESTING FIXTURE
Filed Nov. 25, 1953  4 Sheets-Sheet 1
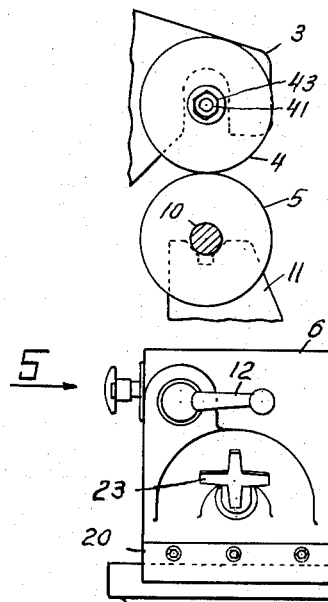
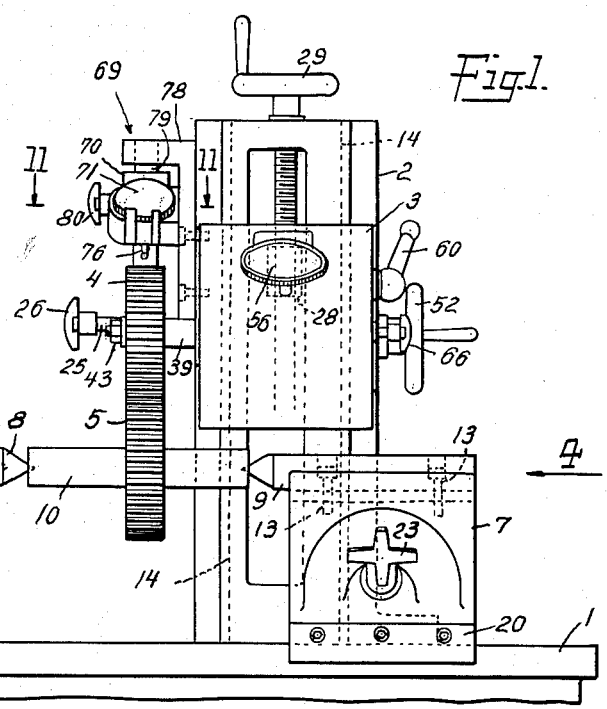
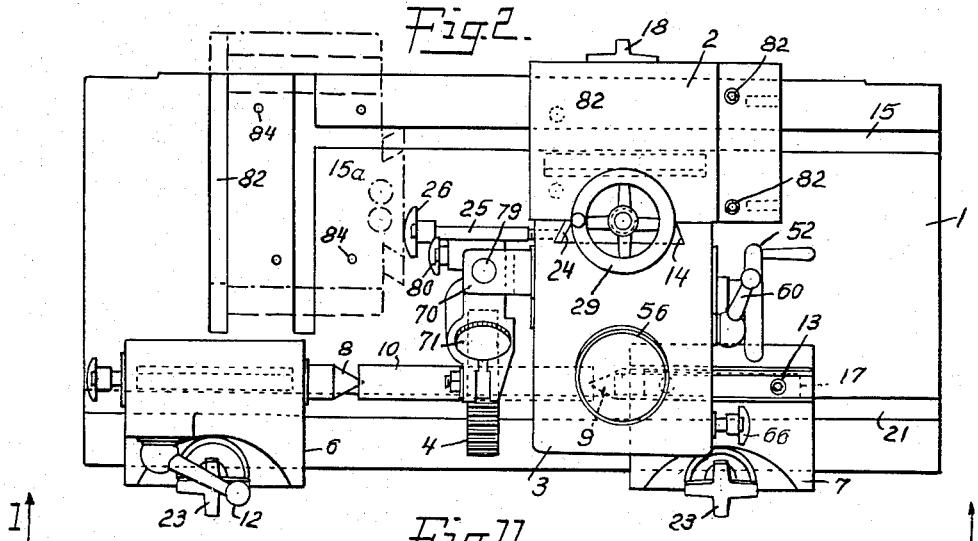
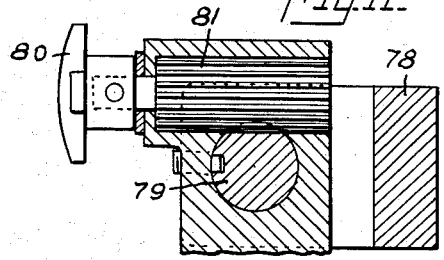
INVENTORS
WILLIAM B. DONAGHEY
CLARENCE B. STAPLETON
JOHN P. DEMPSEY
BY Pennie, Edmonds, Morton,
Barrows and Taylor
THEIR ATTORNEYS

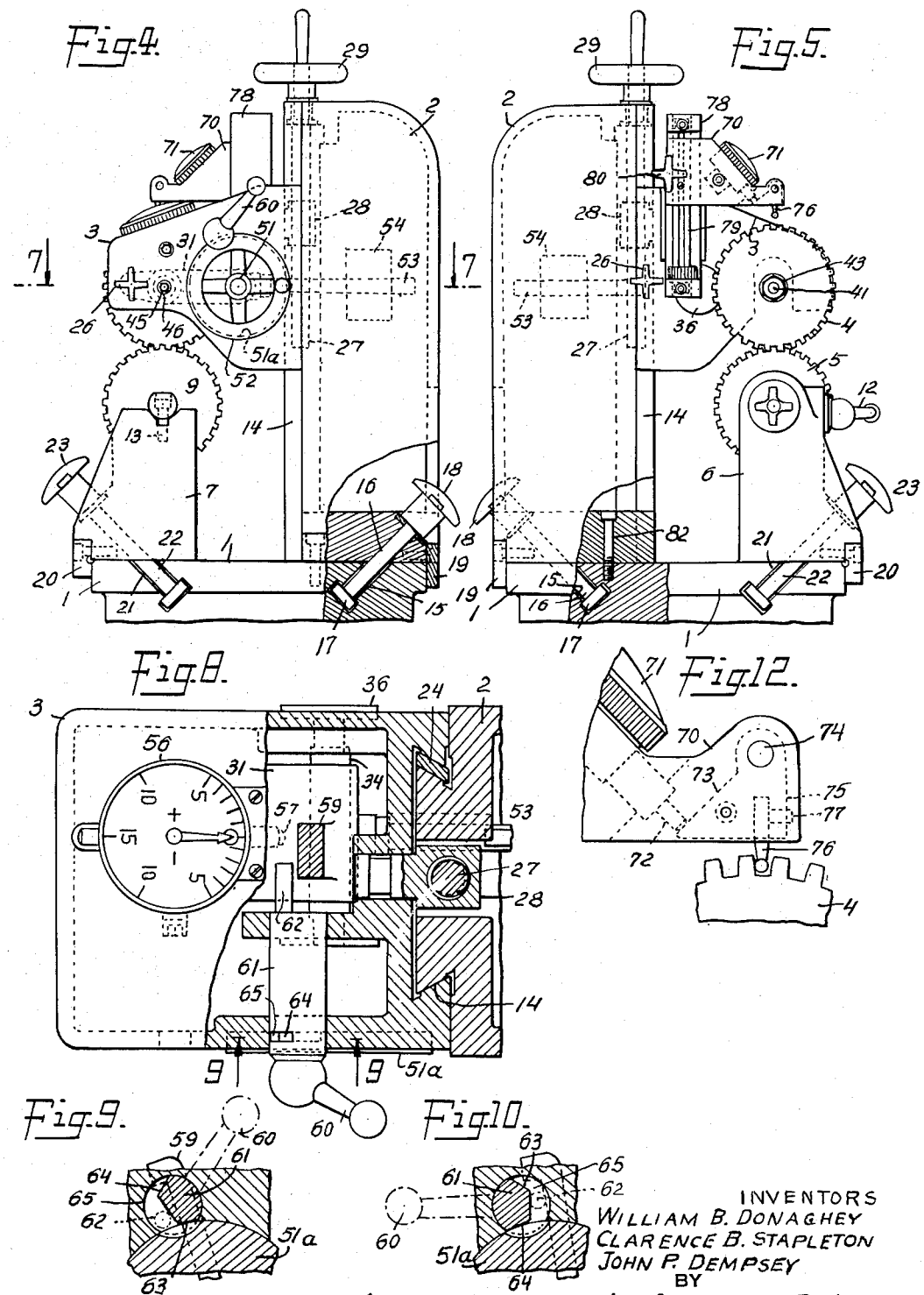

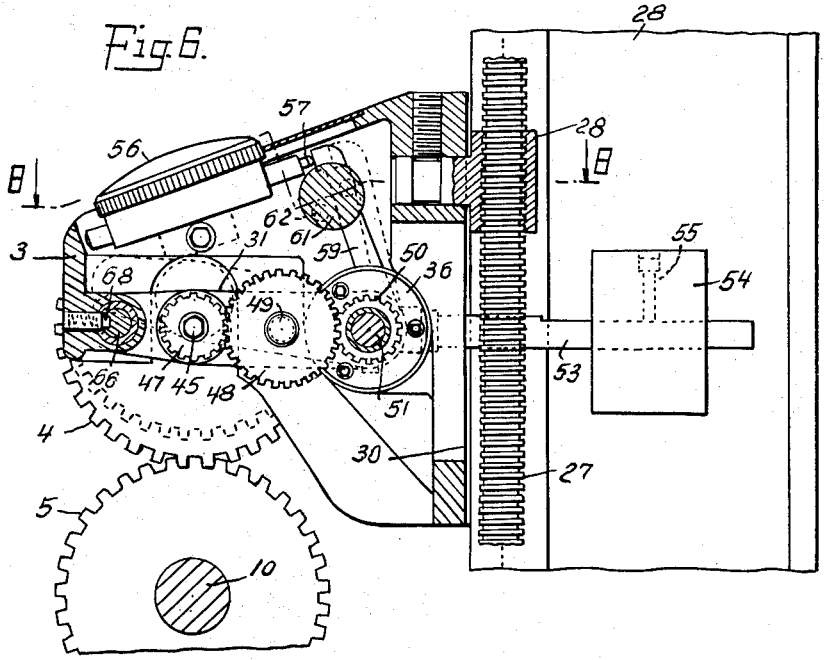
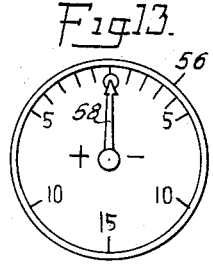
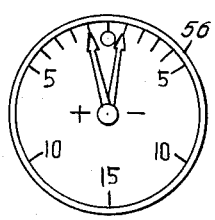
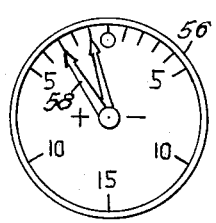
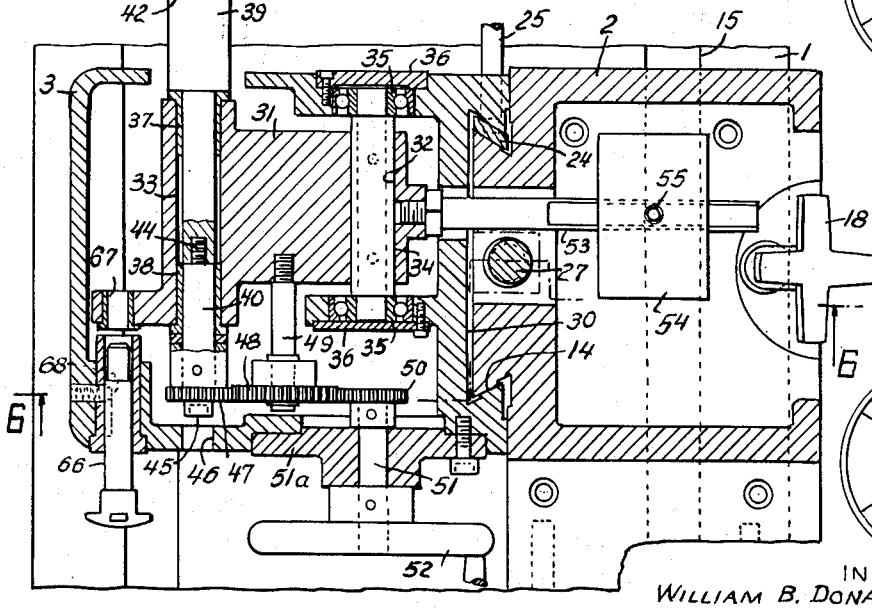
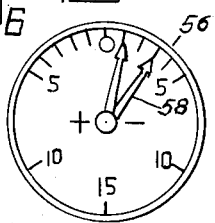
INVENTORS
WILLIAM B. DONAGHEY
CLARENCE B. STAPLETON
JOHN P. DEMPSEY
BY
Pennie, Edmonds, Morton, Barrows and Taylor
THEIR ATTORNEYS

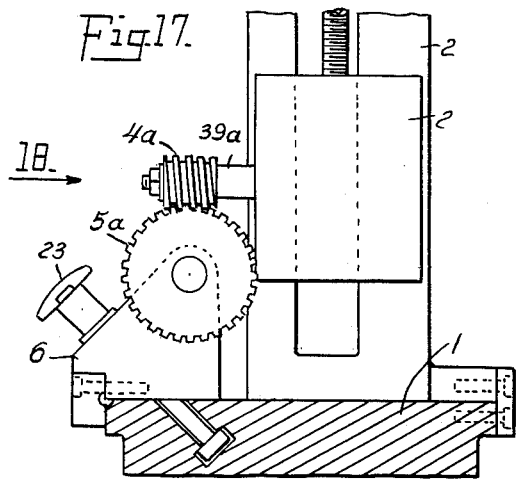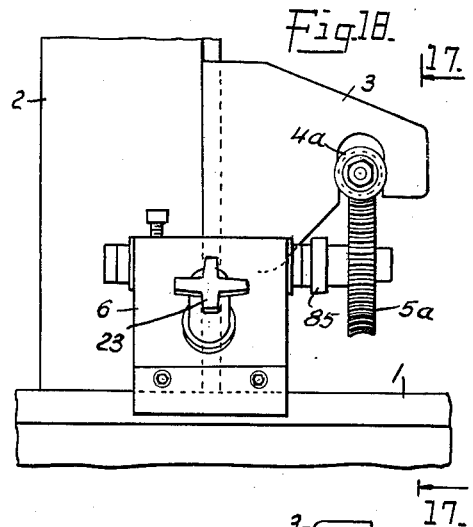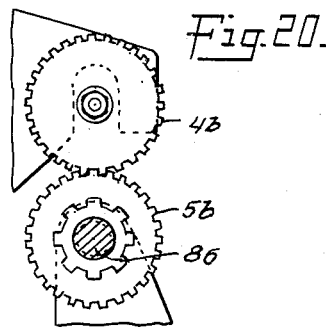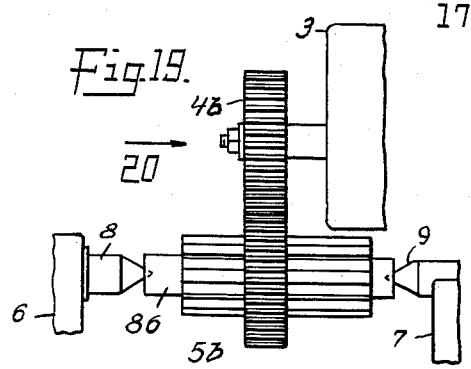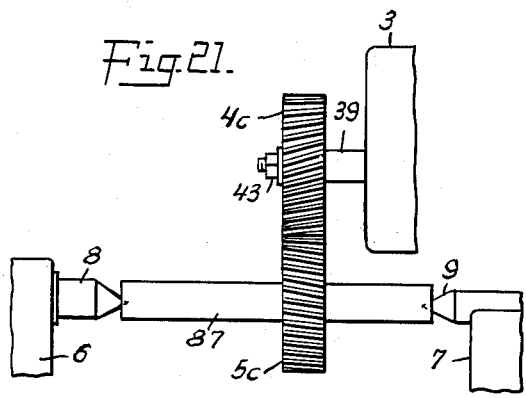

United States Patent Office 2,741,034
Patented Apr. 10, 1956

2,741,034

GEAR TESTING FIXTURE

William B. Donaghey and Clarence B. Stapleton, Royal Oak, and John P. Dempsey, Detroit, Mich., assignors to Vinco Corporation, a corporation of Michigan Application November 25, 1953, Serial No. 394,256

4 Claims. (Cl. 33—179.5)

This invention relates to gear inspection fixtures, and, particularly, to such fixtures for the inspection of production gears by turning or rolling the gear to be tested while in mesh with a master inspection gear.

The present invention has to do with fixtures for determining what is known as "total composite error" which includes the effect of spacing and profile errors, lateral run-out or wobble, and eccentricity; also tooth-to-tooth composite error which includes all of these errors except the last. Such fixtures are used to check "backlash" or the effective space width minus the effective tooth thickness.

Apparatus has heretofore been proposed for making such inspection by turning or rolling the gear to be tested closely meshed with the master gear, and measuring the amount of relative movement between their centers. Also, fixtures have heretofore been proposed for the measurement of backlash between the gears by fixing one of the gears against rotation, the two gears being in mesh with their pitch circles tangent, and then measuring the amount of angular movement permitted the other gear. However, such fixtures as heretofore proposed do not afford a means of measuring these errors with the desired degree of precision, or are not altogether satisfactory for one reason or another.

It is the purpose of the present invention to provide a fixture by means of which such testing of gears can be made with an accuracy heretofore unknown, for example, within one ten-thousandth of an inch (1/10000").

It is also an object of the invention to provide a fixture which is capable of testing all types of gears both internal and external including spur, helical, conical, and bevel worm and spiral gears, to the degree of accuracy indicated.

An important object of the invention is to provide a fixture by means of which the gears are tested under a regulated or controlled meshing pressure between the master gear and the gear under test.

Another object of the invention is to provide a fixture which is so arranged as to permit the rapid changing of the fixture to accommodate gears which vary over a wide range of diameters and widths.

It is also an object of the invention to provide for the testing of a production, work, or part gear while it remains on a work arbor, and while this work arbor is supported either between centers or resting in V blocks.

An exemplifying disclosure of the invention is contained in the accompanying drawings and the following detailed description.

In these drawings:

Fig. 1 is a view in front elevation of the apparatus, with the lower portion of the base and supporting legs broken away, the elevation being indicated by the arrows 1—1 in Fig. 2;

Fig. 2 is a plan view;

Fig. 3 is a fragmentary view showing a detail;

Fig. 4 is a view in end elevation looking from the right of Fig. 1 as indicated by the arrow 4;

Fig. 5 is a similar view looking from the left of Fig. 1 as indicated by the arrow 5;

Fig. 6 is an enlarged vertical transverse section taken on broken line 6—6 of Fig. 7;

Fig. 7 is a horizontal section taken on line 7—7 of Fig. 4 and drawn to the same scale as Fig. 6;

Fig. 8 is a horizontal section (partly in plan) taken on line 8—8 of Fig. 6, also to the same scale;

Figs. 9 and 10 are detail vertical sections taken on line 9—9 of Fig. 8 showing parts in different positions;

Fig. 11 is an enlarged horizontal section taken on line 11—11 of Fig. 1 showing a detail;

Fig. 12 is an enlarged view showing parts of the backlash mechanism with the indexing finger or pick-up pointer engaging a gear;

Figs. 13–16 are plan views of the dial indicator showing the pointer at zero, and at three different positions in the measurement of the same total composite error;

Fig. 17 is a view partly in elevation and partly in section as indicated by line 17—17 of Fig. 18 of the fixture set up for testing a worm gear;

Fig. 18 is a view in elevation of the parts shown in Fig. 17 looking from the left as indicated by the arrow 18;

Fig. 19 is a fragmentary view in elevation of certain parts shown in Fig. 1 wherein the gear under test has a special mounting;

Fig. 20 is a vertical section as indicated by the arrow 20 of Fig. 19; and

Fig. 21 is a view similar to Fig. 19 wherein the gear being tested is a helical gear of the type which meshes with another helical gear mounted on a parallel shaft.

Referring now to the accompanying drawings, the improved fixture comprises, in general, a table or base member 1, a column 2, which is supported on and extends vertically upward from the base 1 and which is preferably adjustable lengthwise of the base, as will be presently described, together with a headpiece or housing 3 which is vertically adjustable on column 2 and carries the mechanism for supporting the master inspection gear 4 and for precisely measuring the tooth-to-tooth and total composite errors when this gear is turned or rolled in mesh with a production, part, or work gear 5.

The fixture includes appropriate supports 6 and 7 for the part gear 5 to be tested. These supports are also preferably mounted for lengthwise adjustment with respect to base 1. These supports may be equipped with bench centers 8 and 9 when the gear 5 to be tested is mounted on a work arbor, such as shown at 10. These centers, however, may be replaced with V blocks, such as the one indicated at 11 in Fig. 3, to suit particular mounting conditions for the gear to be tested. As shown in Fig. 1, the bench center 8 is retractable to the dotted position, for the purpose of inserting a new part gear and its arbor, by swinging the handle 12 to the left. The right-hand center 9 is, however, fixed to support 7 by means of a pair of screws 13, or otherwise.

The surface of base 1 is ground flat within two ten-thousandths of an inch (2/10,000"). The bottom of column member 2 is finished with similar precision and is provided with a dovetail slide 14 which, to the same degree of precision, extends upright at right angles to the surface of base 1. In order to secure the column in fixed position at any point lengthwise of the base 1, the base is provided with a slot 15 which is spaced from and parallel with the rear edge of the base. Slot 15 is an angular slot arranged preferably at 45° to the surface of the base, and extended through this slot is a clamping bolt 16 (Fig. 4).

Bolt 16 has a flat sided head 17, which slides in an enlarged groove extending along the lower edge of slot 15. Head 17 may be in the form of a bar or key, if desired. A hand nut 18 (Figs. 4 and 7) screws onto the threaded upper end of bolt 16, and when this nut is screwed up, the action of the angular bolt is to draw the column 2 forward and exert a clamping action on the base between the slot on a bar 19 at the rear edge of base 1. Bar 19 is secured by bolts, or otherwise, along the lower edge of column 2 at the rear and projects downwardly to engage the rear edge of base 1.

The supports 6 and 7 for the gear 5 to be tested are clamped in a similar manner in any position to which they may be adjusted lengthwise of base 1. For this purpose, each of these supports is provided with a bar 20 which is bolted to its front edge, instead of the rear, and which engages the front edge of base 1. Also, base 1 is provided with a second angular slot 21 which is parallel to slot 15 but extends upwardly in the opposite direction, that is, towards the front of the base instead of towards the rear. Clamping bolts 22 with cooperating hand nuts 23 are provided, one for each of the supports 6 and 7.

The dovetail slide 14 on column 2 for the headpiece 3 includes a gib 24 (Figs. 2 and 7) against which the end of a clamping screw 25 bears for the purpose of locking the headpiece, and therefore the height of the master gear 4, at any desired elevation to which it may be adjusted. A hand knob 26 on end screw 25 facilitates this operation. The vertical adjustment of headpiece 3 on column 2 is accomplished by means of an elongated screw 27 which rotates in an aperture at the upper end of column 2 and which is secured by a suitable means against longitudinal, that is, vertical movement with respect to the column. The lower end of the screw engages a nut member 28 (Fig. 8) on the headpiece 3, and the upper end of the screw is provided with an operating handwheel 29.

The mechanism by which the variation in the distance between centers of the master gear 4 and the production or work gear 5 is precisely measured in order to check the tooth-to-tooth and total composite errors, is shown more particularly in Figs. 6 and 7. This mechanism is mounted within the headpiece, or headframe, 3 which preferably takes the form of an iron casting open at the bottom and provided with vertical side walls and a downwardly sloping upper wall. The rear vertical wall includes a dovetail slot 30 which forms part of the dovetail slide 14 by which the headframe is supported on column 2.

The mechanism for making the precise measurement referred to includes a horizontal arm 31 having extending therethrough near its opposite ends two bores 32 and 33 which are machined parallel with one another within the limits of precision, previously mentioned. Extending through bore 32 there is a supporting shaft 34 which is fixed in any suitable manner within the bore and which is supported at its opposite ends in a pair of precision ball bearings 35 of the type which resist end thrust and consequently support arm 31 for free rocking movement about a horizontal axis with a minimum of friction and without end play. The outer races of these bearings are fitted in suitable apertures prepared, one in a side wall of headpiece 3 and the other in an interior web of the headpiece, and secured therein by means of caps 36.

In the opposite ends of bore 33 of arm 31 are two bushings 37 and 38, and received in bushing 37 is the reduced end portion of an adapter shaft 39 which extends to a position adjacent the end of bushing 38 where it meets the end of a short shaft 40. Shaft 40 remains permanently in position whereas adapter shaft 39 is replaceable in order to accommodate a wide range of sizes of master gears of various thicknesses and varying as to the diameter of their central bore. As shown, the adapter shaft 39 has an extension 41 of the proper diameter and length to suit the particular master gear 4 illustrated, the gear being held in position against a shoulder 42 on the adapter by means of a nut 43 and suitable washer.

The short shaft 40 comprises a drive shaft for slowly rotating the master gear 4 and its intermeshing part gear 5 during the testing operation of the part gear. For the purpose of interconnecting the adapter shaft 39 with the driving shaft 40, the latter is provided with a threaded extension 44 of reduced diameter, and the outer end of this shaft is provided with a socket 45 to receive an Allen wrench inserted through an aperture 46 in the adjacent side wall of headpiece 3. In this manner shaft 40 is held against rotation while the adapter shaft which has a threaded recess in its inner end to receive extension 44 is screwed home, or is unscrewed, depending upon whether the adapter is being inserted or removed.

In order to rotate drive shaft 40, this shaft is provided with a pinion 47 near its outer end, which meshes with an idler gear 48 mounted on a stud shaft 49, projecting from the outer side of arm 31. Meshing with idler gear 48 is a driving pinion 50, preferably of the same diameter as gear 47, and which is fixed to the inner end of a shaft 51. Shaft 51 rotates in a bearing aperture formed in a circular plate 51a bolted to the side wall of headpiece 3 and is in alignment with the axis of supporting shaft 34 for the arm 31. Mounted on the outer end of shaft 51 is a driving handwheel 52, these being manually rotated during the testing operation.

Projecting from arm 31 on the opposite side of supporting shaft 34 from the master gear supporting or adapter shaft 39 there is a substantially horizontal extension 53 which preferably is in the form of a rod or bar fixedly secured to arm 31 by a thread and lock nut connection, as shown in Fig. 7. Extension 53 projects through slot-like openings in headframe 3 and column 2 into the interior of column 2. Adjustably mounted on this extension bar 53 there is a counterweight 54, the purpose of which is to adjust the meshing pressure between the two gears 4 and 5 during the testing operation. This counterweight may be held in its adjusted position by means of a screw 55.

By adjusting the position of counterweight 54 so that it does not quite counterbalance the weight of arm 31 and its connected parts including the master gear 4, the meshing pressure between the two gears can be regulated to the desired small amount so as to urge the two gears together in such a manner to cause them to properly mesh but without producing undue friction between them. The regulating of this meshing pressure to the correct amount is an important factor in obtaining the unusually precise readings of which the present mechanism is capable.

For the purpose of precisely measuring the oscillatory movements of measuring arm 31 as the gears are rotated, an indicator 56, preferably of the dial type, is mounted in an aperture in the sloping roof wall of headpiece 3. This indicator is operated by means of a plunger 57, and the construction is such that a slight lengthwise movement imparted to this plunger is multiplied many times in the motion of the pointer 58 of the indicator. The dial of this indicator is shown in Figs. 14–17, and the divisions on this dial correspond to a variation of one ten-thousandth of an inch ($\frac{1}{10,000}$″) in the distance between the centers of the master gear 4 and the work gear 5. The rocking or oscillating movement of measuring arm 31 corresponding to a change in this intercenter distance is imparted to the end of plunger 57 of the dial indicator by means of an upper extension or finger 59 (Fig. 6) which is preferably formed integrally with arm 31. The arrangement is such that the radial distance from the center of supporting shaft 34 to the center of plunger 57 is substantially equal to the distance from the center of this shaft to the center of adapter shaft 39 which supports the master gear 4.

By testing the part gear 5 with its axis horizontal and with the master gear 4 arranged above the gear under test and with its supporting axis parallel with that of the gear under test, and by arranging the testing arm 31 so that it carries out its measuring movement in substantially horizontal position and supported for oscillation on a horizontal axis, the construction of the gear testing mechanism is greatly simplified, and extremely sensitive, and precise readings are obtainable. These readings can be repeated with remarkable precision, indicating great accuracy. By the use of the horizontally arranged counter-weight extension on the arm, the measuring pressure can be regulated without the use of springs or cords passing over pulleys.

When the checking of one part gear 5 has been completed and it is desired to remove this gear and insert another similar gear in its place, the master gear 4 is raised so that its teeth no longer mesh with those of the part gear. This is done by means of a swinging handle 60 (Fig. 8), which is fixed on the outer end of a short shaft 61. This shaft is mounted for rocking movement in the head-frame 3, and at its inner end is provided with an eccentric pin 62 which engages the front surface of finger 59 when the handle is swung to the left from the position shown in Figs. 4, 8 and 9 to the position shown in Fig. 10. This causes finger 59 to be moved to the right to the dotted position shown in Fig. 6 and consequently causes the raising of arm 31 and master gear 4 to the dotted position here indicated.

This mechanism is provided with a two-position stop arrangement, as shown in Figs. 9 and 10, and the handle is stable in each of these positions. This stop means is formed by the angularly placed bottom surfaces 63 and 64 of an odd shaped groove 65 cut in the surface of shaft 61 near its outer end. The adjacent portion of the edge of disc 51a is thinned down so as to enter this groove and serve as a retainer holding shaft 61 from shifting lengthwise, and, when handle 60 is swung rearward or to the right (Fig. 4), to the release position of the master gear supporting arm 31, the bottom surface 63 of the slot engages the edge of disc 51a to stop further movement of the arm. The arrangement is such that if no work gear is in place the downward movement of arm 31 will be arrested before adapter shaft 39 is substantially below meshing position, so as to prevent damage to the mechanism of dial indicator 56.

In the opposite position of arm 60, shown in Fig. 10, arm 61 is held in its upper position, the opposite bottom surface 64 engaging the edge of disc 51a to stop further movement of handle 60 in that direction. It will be seen from Fig. 10 that the arrangement is such that the center of pin 62 is above the horizontal center line, and consequently automatically locks arm 31 in its raised position.

To set the fixture for testing or checking a gear of a given size for composite error and back lash involves first a setting of the center distance between the center of test gear support shaft 39 and bench centers 8 and 9. This can be done in a number of ways but the simplest method is to install pitch diameter discs in place of the master gear 4 and the work gear 5. These discs are accurately made to the respective diameters of the master gear to be used and the work gear to be tested. Before the fixture is adjusted to bring the pitch discs into tangential relationship, it is necessary to lock the master gear supporting arm 31 in horizontal position.

This is accomplished by means of a plunger 66 which is arranged to slide horizontally in an aperture in one side wall of headpiece 3 close to aperture 46. When the arm 31 is in horizontal position, locking plunger 66 may be shoved inwardly to cause its inner end to enter a locking aperture 67 arranged in arm 31 radially outward from the shafts 39 and 40. Plunger 66 is held in any position to which it may be moved by a friction pin 68 which is biased against the side of the plunger by a compression spring.

With arm 31 locked in horizontal position by means of plunger 66, the handwheel 29 is rotated until headframe 3 has been moved downwardly and the two pitch discs brought into precise tangential relationship. Thereupon, the pitch discs are removed, and the master gear to be used is installed, along with its appropriate adapter 39, on arm 31. Arm 31 is raised by rocking the handle 60 from the position shown in Figs. 4 and 9 to the position shown in Fig. 10. This raises the master gear 4 sufficiently so that the work gear 5 can be placed in position with its arbor 10 between the bench centers 8 and 9, with the teeth of the two gears out of mesh with one another.

It will be understood, under certain conditions of gear manufacture, it is not necessary to first place the centers of the master gear and work gear at the correct intercenter distance by means of the pitch discs, or otherwise. If this setting is not made, the headframe 3 is merely lowered by turning the handwheel 29, with the plunger 66 locking arm 31 in horizontal position, until the teeth of the master gear 4 mesh lightly with the teeth of the production gear 5. Thereupon the plunger 66 is withdrawn and the teeth are allowed to mesh under the desired meshing pressure which is regulated by means of the counterweight 54.

From this point on the procedure in testing the part gear 5 is the same, whether or not the intercenter setting has been made by means of pitch discs, or otherwise.

With the arm 31 locked in horizontal position by means of locking plunger 66, the arrangement of the dial indicator actuating mechanism is such that the pointer 58 will be approximately at the zero position of the dial. It may be set exactly at zero by turning the rim of the indicator, as the dial is connected to turn with the rim. When plunger 66 is withdrawn and the gears are allowed to mesh with one another under a carefully controlled meshing pressure, the pointer 58 will move from the zero position, unless the part gear 5 is a perfect gear. This is the condition shown in Fig. 13, whereupon turning the two gears in mesh with one another through a complete revolution by means of handwheel 52, pointer 58 remains at zero. The total composite error in this case is zero.

Figs. 14, 15 and 16, represent three cases where the total composite error of the three different gears under test is two ten-thousandths of an inch ($\tfrac{2}{10,000}$") in each case, although the three gears are not alike. The gear tested according to Fig. 14, shows an extreme position of pointer 58 from plus one ten-thousandth ($+\tfrac{1}{10,000}$) to minus one ten-thousandth ($-\tfrac{1}{10,000}$) of an inch. This shows that the tight mesh rolling pitch diameter of this gear varies by these amounts.

The gear tested according to Fig. 15 shows an extreme position of the pointer 58 from plus one ten-thousandth of an inch ($+\tfrac{1}{10,000}$") to plus three ten-thousandths of an inch ($+\tfrac{3}{10,000}$").

The pitch diameter of this gear is from one to three ten-thousandths of an inch too large.

The gear tested according to Fig. 16 shows an extreme position of the pointer from minus one ten-thousandth ($-\tfrac{1}{10,000}$) to minus three ten-thousandths ($-\tfrac{3}{10,000}$) of an inch, the pitch diameter of this gear being from one to three ten-thousandths of an inch too small.

When checking the tooth-to-tooth composite error which shows the effect of spacing and profile errors of the gear under test, but not its eccentricity, the fixture is set as above described so that when the center distance between the master gear and the gear under test, is correct, the indicator pointer 58 stands at zero. The arm locking plunger 66 is moved to the outward position, and the counterbalance weight 54 is adjusted so as to cause the two gears to be in tight mesh with each other under a regulated meching pressure. The two gears are then rolled together by turning the driving handwheel 52, and a reading of the dial indicator pointer 58 is taken as each port gear tooth comes into contact with the master inspection gear 4.

In order to measure the backlash between the gears, a backlash measuring mechanism, indicated generally by numeral 68 (Fig. 1), is mounted on the left side wall of the headpiece or head frame 3. This mechanism comprises a housing 70, also having a sloping upper wall in which is mounted a backlash dial indicator mechanism 71 (Figs. 5 and 12). The operating plunger 72 of this indicator is actuated by one arm of a bell crank lever 73 which is pivoted at 74 in housing 70 (Fig. 12). The downwardly extending arm 75 of this lever is provided with a socket within which an indexing or pick-up finger 76 is secured by means of a set screw 77. This pick-up finger 76 is constructed with a spherical end to engage a tooth at the top of master gear 4.

The housing 70 for the backlash mechanism is not secured directly on the head frame 3, but is mounted thereon by means of a U-shaped bracket 78 (Fig. 1). This bracket is secured to the side of headpiece 3 by means of screws, as shown, and is provided with a rigid vertical rod or bar 79 which extends between the upper and lower legs of the bracket. The housing 70 for the backlash mechanism is vertically adjustable on this bar 79. This adjustment is accomplished by means of a hand knob 80 on the end of a pinion 81 (Fig. 11) which engages a series of rack teeth on the rear of bar 79.

By means of this mechanism the backlash, that is, the effective space width of one of the gears less the effective tooth thickness of the other gear, can be measured directly. In making a measurement, the center distance between the two gears is first set by employing pitch diameter discs, as previously described, or by means of some other appropriate method of setting the center distance. This establishes a reference from which the backlash can be determined. The rim of arm or backlash indicator 71 is now turned to set the zero position of the dial under pointer 58, with the pitch discs tangent to one another, and with the arm 31 locked by means of plunger 66. The arm 31 is then unlocked, the master pitch discs removed, and the master inspection gear and the part gear assembled in position. The arm 31 is then lowered again by means of handle 60 until locking plunger 66 will re-enter the locking aperture 67 in arm 31. With this preparation the fixture is ready for the measurement of backlash.

The backlash mechanism housing 70 is now lowered by turning knob 80 until the spherical end of pick-up finger 76 engages the master gear at or near its pitch line. This pick-up finger 76 will transmit a direct backlash measurement to the backlash dial indicator 71 through the bell crank lever 73 when the master gear is rotated with its teeth in mesh with the part gear, the part gear being held in stationary position.

In the event that it is not desired to take full advantage of the present invention, the column 2 can be mounted in fixed position on base 1, instead of being mounted to slide lengthwise of the base, as previously described. For securing the column 2 in fixed position, four screws or bolts 82 (Figs. 2 and 5) are arranged to pass through apertures in the lower part of column 2 and are received in threaded holes provided in the top of base 1.

In order to measure the total composite error of worm gears, column 2 is shifted to a crosswise position at the left of base 1. For this purpose, a crosswise angular slot 15a is provided in base 1 which may be a continuation or join the end of the similar slot 15. This rod 15a receives the locking bolt 21 and the locking bar or key 17. In order to receive the bar 20 at the back of the column, a vertical cross slot is arranged parallel with angular slot 15a. With this arrangement the mounting and securing of the column 2 in this crosswise position is by means of the clamping nut 23, as previously described. If desired, these two additional slots 15a and 83 may be omitted, and additional bolt-receiving holes 84 may be provided, and the column secured in place by means of the four bolts 82.

As will be seen from Figs. 17 and 18, the mounting of the column 2 crosswise of the base places the adapter shaft 39a of the master worm 4a at right angles to the axis of the adapter 85 by which the worm gear 5a, to be tested, is supported, so that the worm and gear are in the usual operative position for such gearing. The adapter 85 constitutes a shaft for supporting the worm gear and is placed in the support 6 instead of the bench center 8.

In testing the worm gear 5a for total composite error, the procedure is the same as described previously in connection with the testing of the spur gear 5. That is to say, the worm 4a is rotated by turning the hand driving wheel 52 until the worm gear 5a has been turned throughout a complete revolution, and during this time the movement of the dial indicator is watched, and its maximum movements in both the plus and minus directions are noted.

Figs. 19 and 20 illustrate the testing of a splined gear 5b with a master inspection gear 4b. The procedure with such a gear is precisely the same as described above in connection with the testing of gear 5 except that the gear is tested on shaft 86 which is a spline work arbor instead of on plain work arbor 10.

Fig. 21 shows the testing of a helical gear 5c with a master helical gear 4c, wherein the shafts of the two gears are parallel with one another. Master gear 4c may be supported upon adapter shaft 39, or upon a somewhat different adapter if the bore of this gear is of a different diameter than master gear 4. Helical gear 5c is shown as being tested on shaft 87.

For the testing of helical gears which operate on shafts at right angles to one another the testing fixture is set up as described in connection with worm gear 5a and substantially as shown in Figs. 17 and 18.

By means of the fixture of the present invention, not only can the checking of production gears be done to an unusually high degree of precision, but also the checking can be done much more rapidly and conveniently than with the gear checking fixtures which have heretofore been available. When checking a quantity of identical part gears, their successive insertion and removal is facilitated through the operation of lifting the master gear by means of the swinging handle 60, and also by the separation of the bench centers by swinging lever 12. The setting up of the fixture when changing over from one size gear to another, or to a gear of the same size, which is located at a different position on the work arbor, or on its own shaft, is facilitated through the ability to raise and lower the master gear by means of the crank handle 29, and also by the ability to shift the column 2 along the base 1 so as to bring the master gear into registration with the position of the part gear on its shaft or arbor. This same adjustment is also facilitated, under certain circumstances, by the ability to shift the supports 6 and 7 for the bench centers longitudinally along the base 1 with respect to the location of the column 2.

It will be understood that changes may be made in the construction and arrangement of the testing fixture which do not depart from the scope of the appended claims without departing from the spirit of the invention.

We claim:

1. In a gear testing fixture, a frame, a measuring arm, pivot means on said frame for supporting said arm for rocking movement, a master gear, a shaft carried by said arm for rotatably mounting said master gear on said arm, means on said frame for supporting a gear to be tested with the teeth thereof in mesh with those of said master gear, means for precisely measuring the rocking movement of said arm about said pivot as said gears are rotated, and mechanism for rotating said intermeshing gears comprising a shaft supported on said frame for rotation about the axis of said measuring arm pivot means, a hand wheel fixed to said shaft, and a gear train rotatably connecting said shaft with said master gear supporting shaft.

2. In a gear testing fixture, a frame, a measuring arm, pivot means on said frame for supporting said arm for rocking movement, a master gear, a shaft carried by said arm in parallel spaced relation to the axis of said pivot means, said shaft having an inner section and an outer section projecting laterally from said arm for rotatably mounting said master gear at one side of said arm, means on said frame for supporting a gear to be tested with the teeth thereof in mesh with those of said master gear, means for precisely measuring the rocking movement of said arm about said pivot as said intermeshing gears are rotated, and mechanism for rotating said gears comprising a shaft supported on said frame for rotation about the axis of said measuring arm pivot means, a hand wheel on said shaft and a gear train rotatably connecting said shaft with said inner shaft section, said outer shaft section being replaceable with another similar shaft section constructed to mount a different master gear.

3. In a gear testing fixture, a frame, a measuring arm, pivot means on said frame for supporting said arm for rocking movement, a master gear, a shaft carried by said arm in parallel spaced relation to the axis of said pivot means, said shaft having a section permanently mounted within a bore in said arm and a removable section having a detachable connection with said permanent section and projecting from said bore for rotatably mounting said master gear at one side of said arm, means on said frame for supporting a gear to be tested with the teeth thereof in mesh with those of said master gear, means for precisely measuring the rocking movement of said arm about said pivot as said intermeshing gears are rotated, and mechanism for rotating said gears comprising a shaft supported on said frame for rotation about the axis of said measuring arm pivot means, a hand wheel on said shaft the inner ends of said hand wheel shaft and said permanent shaft section being in approximately the same plane, and a gear train rotatably connecting said shafts, said removable shaft section being replaceable with another similar shaft section constructed to mount a different master gear.

4. In a gear testing fixture, a frame, a measuring arm, pivot means on said frame for supporting said arm for vertical rocking movement, a shaft for rotatably mounting a master gear on said arm, said shaft being disposed parallel to the axis of said pivot, a master gear on said shaft, means on said frame for supporting a gear to be tested with the teeth thereof in mesh with those of said master gear, indicator mechanism actuated by said arm for precisely measuring the oscillating movement of said arm about said pivot as said gears are rotated with their teeth in mesh, and mechanism for actuating said arm to disengage the teeth of said gears for permitting the removal and replacement of the gear to be tested, said mechanism comprising a rock shaft having an external operating handle and having an eccentric pin projecting from its inner end and engaging and raising said measuring arm to disengage the said gear teeth when the rock shaft is rotated in one direction, said pin allowing said measuring arm to lower when the rock shaft is oppositely turned, bearing means for said rock shaft, and means for retaining said shaft in said bearing means by preventing lengthwise shifting of the shaft, said retaining means comprising a disc fixed to said frame having an edge portion which is received within a groove formed in the cylindrical surface of said shaft, said groove having end walls less than 360° apart, said end walls being arranged to contact the edge of said disc to form two stop means for limiting the rotation of said rock shaft, one of said stop means arresting the rotation of said shaft so as to hold said arm in release position, and said second stop means limiting the rotation of the rock shaft in the opposite direction to arrest the movement of the measuring arm near its measuring position so as to prevent damage to the indicator mechanism should no work gear be in place.

References Cited in the file of this patent

UNITED STATES PATENTS

| 1,363,799 | Logue | Dec. 28, 1920 |
| 2,060,803 | Falk | Nov. 17, 1936 |
| 2,369,477 | Martin | Feb. 13, 1945 |
| 2,394,623 | Martin | Feb. 12, 1946 |
| 2,447,445 | Widen | Aug. 17, 1948 |
| 2,448,106 | Mannerbrink | Aug. 31, 1948 |
| 2,539,239 | Ernst | Jan. 23, 1951 |
| 2,540,961 | Osplack | Feb. 6, 1951 |
| 2,661,542 | Bean | Dec. 8, 1953 |

FOREIGN PATENTS

| 41,668 | France | Mar. 10, 1933 |
| 717,706 | Germany | Feb. 21, 1942 |

OTHER REFERENCES

American Machinist, pages 97 and 98, Feb. 18, 1943.